(12) United States Patent
Edgerly

(10) Patent No.: US 7,401,715 B2
(45) Date of Patent: Jul. 22, 2008

(54) ROTATABLE STRAP ASSEMBLY FOR A LOAD CARRIER

(75) Inventor: Jeffrey R. Edgerly, Bristol, CT (US)

(73) Assignee: Thule Sweden AB, Hillerstorp (SE)

( * ) Notice: Subject to any disclaimer, the term of this patent is extended or adjusted under 35 U.S.C. 154(b) by 7 days.

(21) Appl. No.: 11/307,299

(22) Filed: Jan. 31, 2006

(65) Prior Publication Data
US 2006/0283897 A1    Dec. 21, 2006

Related U.S. Application Data

(63) Continuation of application No. 10/063,299, filed on Apr. 9, 2002, now abandoned.

(51) Int. Cl.
*B60R 11/00* (2006.01)
*B62D 43/02* (2006.01)
*B60R 9/048* (2006.01)
*B60R 9/06* (2006.01)

(52) U.S. Cl. ............... 224/42.26; 224/324; 224/502; 224/534; 224/537; 224/924

(58) Field of Classification Search .......... 224/42.26, 224/317, 321, 322, 324, 325, 326, 495, 502, 224/509, 533, 534, 537, 567, 568, 571, 924; 280/762, 769; 211/17, 20; 410/41, 99, 100
See application file for complete search history.

(56) References Cited

U.S. PATENT DOCUMENTS

| | | | | |
|---|---|---|---|---|
| 3,039,634 A | * | 6/1962 | Hobson et al. | 224/534 |
| 3,257,052 A | * | 6/1966 | McMiller | 224/324 |
| 4,046,297 A | * | 9/1977 | Bland | 224/534 |
| 4,702,401 A | * | 10/1987 | Graber et al. | 224/324 |
| 5,042,705 A | * | 8/1991 | Johansson | 224/924 |
| 5,435,475 A | * | 7/1995 | Hudson et al. | 224/324 |
| 5,570,825 A | * | 11/1996 | Cona | 224/495 |
| 5,624,063 A | * | 4/1997 | Ireland | 224/324 |
| 6,019,266 A | * | 2/2000 | Johnson | 224/534 |
| 6,283,310 B1 | * | 9/2001 | Dean et al. | 224/924 |
| 6,431,423 B1 | * | 8/2002 | Allen et al. | 224/537 |

FOREIGN PATENT DOCUMENTS

EP    563463 A1 * 10/1993 .......... 224/324

* cited by examiner

*Primary Examiner*—Gary E Elkins
(74) *Attorney, Agent, or Firm*—Novak Druce + Quigg, LLP

(57) ABSTRACT

A rotatable strap arrangement for a load carrier of a transporting vehicle. The load carrier includes an elongate tray with a rotation mechanism coupled thereto, the rotation mechanism permitting rotation relative to the elongate tray. The rotatable strap arrangement has a strap coupled to the rotation mechanism, the strap operable for securing an object to the elongate tray. The rotatable strap arrangement further includes a strap receiving mechanism coupled to the rotation mechanism, the strap receiving mechanism operable for receiving the strap.

18 Claims, 7 Drawing Sheets

ROTATABLE STRAP ASSEMBLY FOR A LOAD CARRIER

CROSS-REFERENCE TO RELATED APPLICATIONS

The present application is a continuation of U.S. application Ser. No. 10/063,299 filed 9 Apr. 2002 now abandoned. Said application is expressly incorporated herein by reference in its entirety.

FIELD OF THE INVENTION

The present invention relates generally to a rotatable strap assembly for a load carrier attached to a transporting vehicle. More specifically, the present invention relates to a rotatable strap assembly for a load carrier that provides an operator adequate access to the strap assembly regardless of the current position of the strap, e.g., whether the strap is positioned on the driver-side of the vehicle or on the passenger-side of the vehicle.

BACKGROUND OF THE INVENTION

Conventional load carriers, such as bicycle carriers, kayak/canoe carriers, ski carriers, snowboard carriers, luggage carriers, and the like, typically include at least one securing device. The securing device can be a strap, buckle, fastener, mount, clamp, and the like. For example, a conventional roof-top bicycle carrier includes one or more elongate wheel trays that extend along the length of a vehicle. Typically, these wheel trays are detachable and can be mounted on either side of the vehicle. The wheel trays are attached to the roof of the vehicle utilizing one or more lateral attachment mechanisms or cross bars of a rack system that extend across the width of the vehicle. Typically, the securing devices are fixedly or movably attached to the wheel trays and are operable for holding a bicycle in place on the roof of the vehicle, optionally in an upright position. The securing devices can include, for example, fork supports, frame clamps, and wheel straps. A wheel strap assembly, which typically includes a strap portion and a buckle portion, can be utilized to secure the rear wheel of a bicycle to one of the wheel trays. Accordingly, the wheel strap assembly is preferably offset from center with respect to the given wheel tray. The buckle portion of the wheel strap assembly typically faces outwardly toward the driver-side of the vehicle for a driver-side mounted wheel tray and outwardly toward the passenger-side of the vehicle for a passenger-side mounted wheel tray, such that an operator is provided adequate access to the buckle portion of the wheel strap assembly.

A problem arises, however, when a given wheel tray is moved from one side of the vehicle to another, such as from the driver-side of the vehicle to the passenger-side of the vehicle merely by sliding the tray across the vehicle on the cross bars. This problem is illustrated between FIGS. 1 and 2.

Referring to FIG. 1, a wheel tray 10 is initially positioned on the driver-side 12 of a vehicle 14. A wheel strap assembly 16 is utilized to secure the rear wheel of a bicycle (not shown) to the wheel tray 10. The buckle portion 18 of the wheel strap assembly 16 faces outwardly toward the driver-side 12 of the vehicle 14. If the tray 10 is completely detached from the rack and positioned on the opposite side of the vehicle with the buckle 18 of the wheel strap assembly 16 facing outwardly, then the bicycle must be oriented in the opposite direction; that is, with the back of the bicycle facing toward the forward direction of travel. Typically, because operators prefer the bicycle to have the same orientation as the vehicle 14, this situation is undesirable. One approach to solving this problem is to make the wheel strap assembly 24 symmetrical, at least with respect to the connective mechanism to the wheel tray. In this traditional configuration, the wheel strap assembly 24 is intended to be removed and reinstalled in an opposite orientation to secure the rear wheel of the bicycle to the wheel tray 26.

Referring to FIG. 2, another approach to solving this problem is to make the wheel tray 10 slidable across the width 28 of the vehicle 14, typically on the cross bars or members of the carrying a rack system. This approach, however, results in the buckle portion 30 of the wheel strap assembly 24 being in a position such that the operator has inadequate access to the buckle portion 30 of the wheel strap assembly 24. If the wheel strap assembly 24 is made to be detachable and moveable, binding parts, scratched paint, and the like can result during execution of the process.

Thus, what is needed is a relatively simple wheel strap assembly that provides an operator adequate access to the wheel strap operating assembly regardless of the installed configuration of the wheel strap; that is, whether the wheel strap is positioned on the driver-side of the vehicle or on the passenger-side of the vehicle.

SUMMARY OF INVENTION

The present invention provides a rotatable strap assembly for a load carrier that provides an operator adequate access to the strap assembly regardless of the position of the wheel strap, e.g., whether the wheel strap is positioned on the driver-side of a transporting vehicle or on the passenger-side of a transporting vehicle. The rotatable strap assembly is suitable for use on any load carrier that requires the use of a strap. Specifically, the rotatable strap assembly is suited for use with an elongate wheel tray, such as that used to carry a bicycle, especially an elongate wheel tray that is translatable across the width of the vehicle.

In one embodiment of the present invention, a rotatable strap assembly for a load carrier of a transporting vehicle is disclosed. The load carrier includes an elongate tray, having a rotation mechanism coupled to the elongate tray in which the rotation mechanism permits rotation of the strap assembly relative to the elongate tray. The rotatable strap assembly also includes a strap coupled to the rotation mechanism, the strap is operable for securing an object or article such as a bicycle to the elongate tray. The rotatable strap assembly further includes a strap receiving mechanism coupled to the rotation mechanism, the strap receiving mechanism operable for receiving the strap.

In another embodiment of the present invention, a load carrier of a transporting vehicle is disclosed having an elongate structural member, exemplarily a wheel tray that is operable for carrying a wheel of a bicycle. A rotation mechanism is coupled to the elongate wheel tray and the rotation mechanism permits of the rotation of a connected assembly, such as a wheel strap assembly, relative to the elongate wheel tray. The load carrier also includes a wheel strap coupled to the rotation mechanism, the wheel strap operable for securing the wheel of the bicycle to the elongate wheel tray. The load carrier further includes a wheel strap receiving mechanism coupled to the rotation mechanism, the wheel strap receiving mechanism operable for receiving the wheel strap.

In another embodiment, the present invention again takes the form of a wheel strap assembly for a bicycle carrier mountable to a transporting vehicle. The bicycle carrier includes an elongate wheel tray having a positioning mechanism coupled to the elongate wheel tray. The positioning mechanism permits movement relative to the elongate wheel tray. The wheel strap assembly further includes a wheel strap that is coupled to the positioning mechanism and which is operable for securing a wheel of the bicycle to the elongate wheel tray. The wheel strap assembly further includes a wheel strap receiving mechanism coupled to the positioning mechanism, the wheel strap receiving mechanism operable for receiving the wheel strap.

DETAILED DESCRIPTION

A rotatable strap assembly, also referred to as a rotatable strap arrangement, according to the teachings of the present invention can be used with any load carrier that utilizes a strap or similar arrangement to secure an object to the load carrier. The rotatable strap assembly is particularly suited for use on a roof-top bicycle carrier or a truck-bed bicycle carrier. The following detailed description is directed towards a rotatable strap assembly, e.g., a rotatable wheel strap assembly, for use on a roof-top bicycle carrier, however the rotatable strap assembly is not limited to such carrier configurations.

Figure 1:
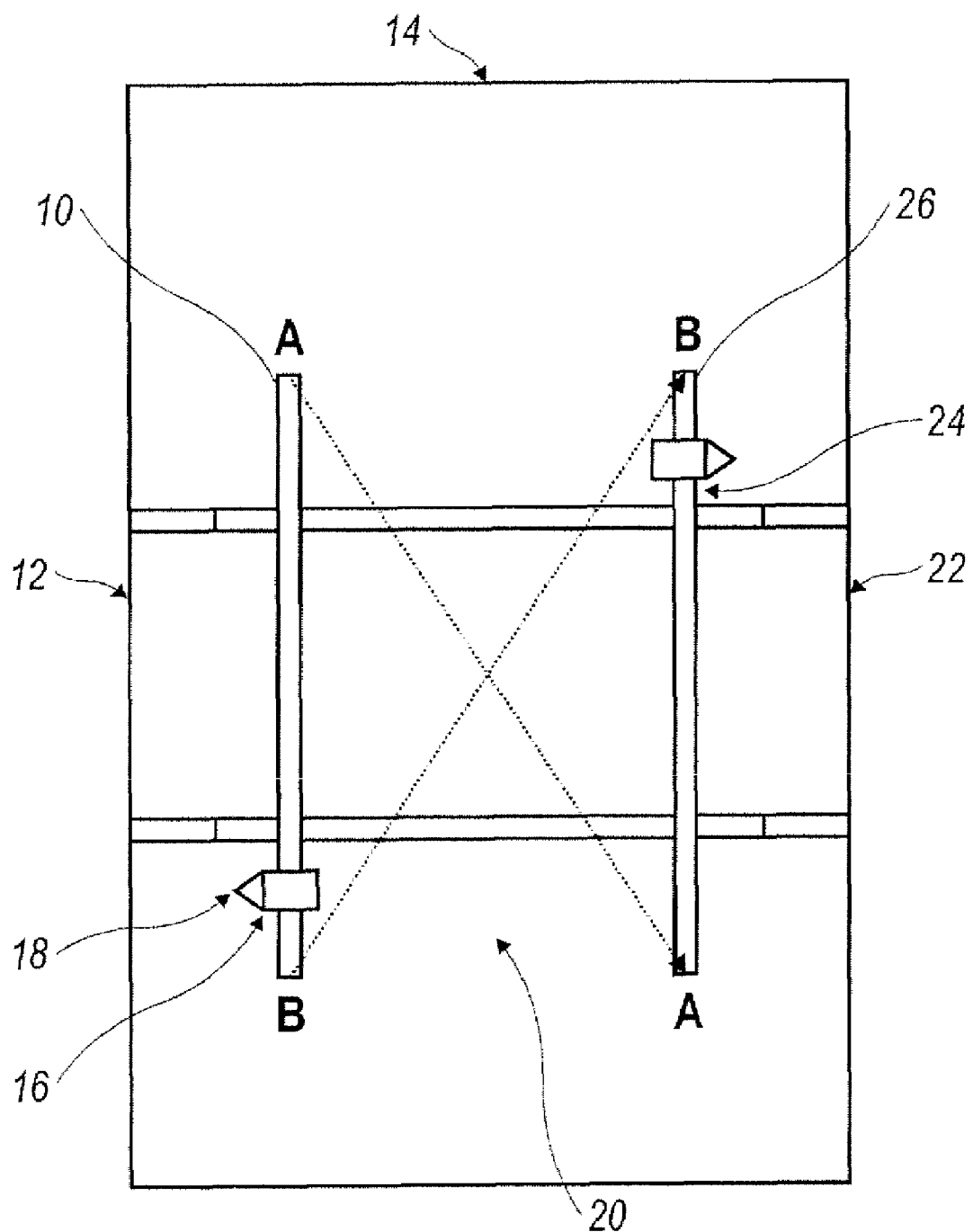
FIG. 1 is a top plan view of a conventional bicycle carrier illustrating the problems associated with a traditional detachable elongate wheel tray.
Figure 2:
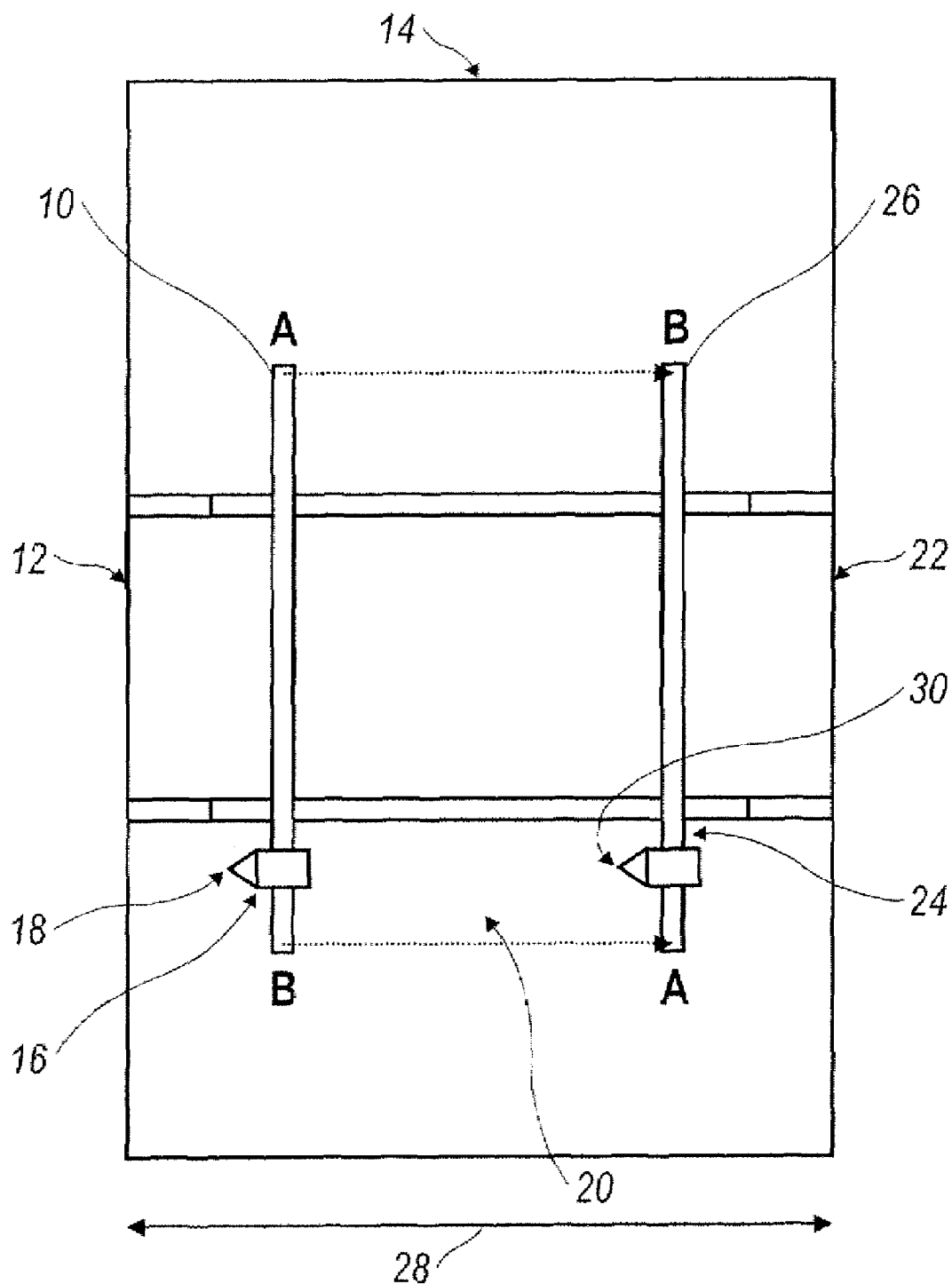
FIG. 2 is a top plan view of a conventional bicycle carrier illustrating the problems associated with a translatable elongate wheel tray.
Figure 3:
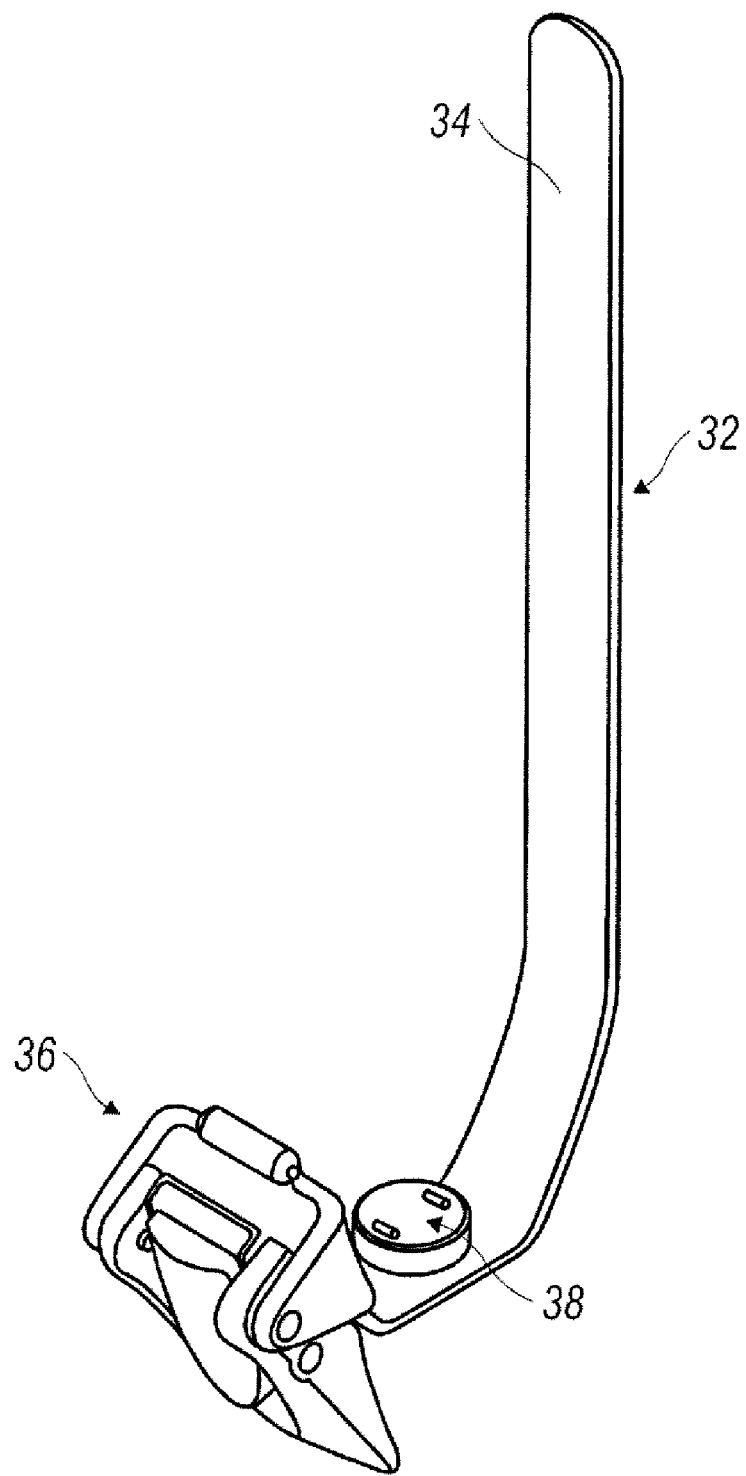
FIG. 3 is a perspective view of a rotatable wheel strap assembly configured in accordance with an exemplary embodiment of the present invention.
Figure 4:
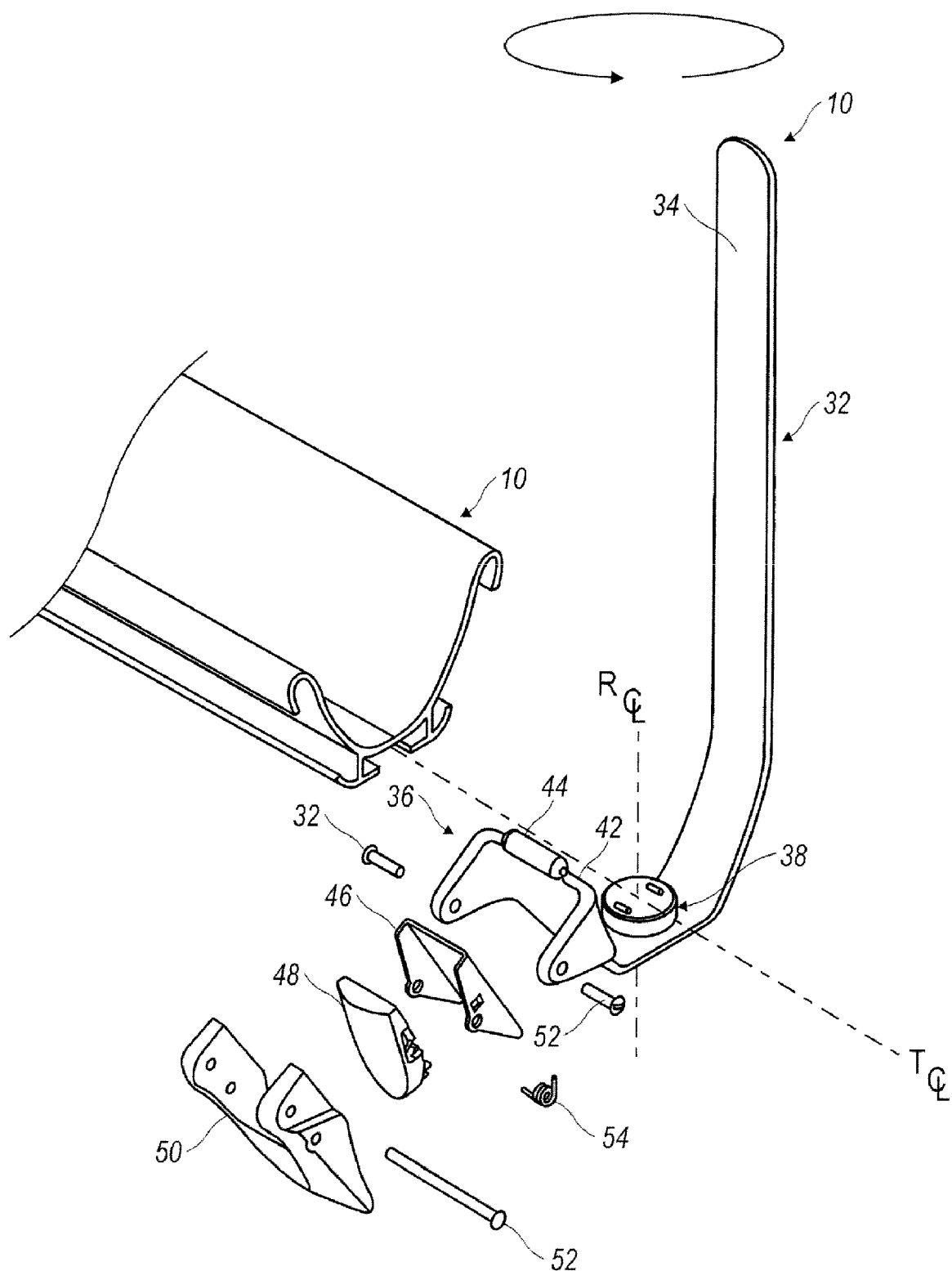
FIG. 4 is an exploded perspective view of the rotatable wheel strap assembly of FIG. 3.

Referring to FIGS. 3 and 4, an exemplary embodiment of the present invention is shown in which a rotatable wheel strap assembly 32 has a wheel strap 34 and a wheel strap receiving mechanism 36 fixedly or flexibly attached to a rotation facilitating or rotation mechanism 38. The wheel strap 34 is operable for securing a wheel, such as a bicycle wheel, to an elongate wheel tray like that utilized in certain types of conventionally designed bicycle carriers. The wheel strap 34 can be made of, for example, nylon, plastic, leather, and the like. An engaging end 40 of the wheel strap 34 engages and passes through the wheel strap receiving mechanism 36 for securing the bicycle wheel to the tray that is secured to a roof rack system of a transporting vehicle.

An exemplary wheel strap receiving mechanism 36 is illustrated in FIGS. 3 and 4, however the strap receiving mechanism 36 of the present invention should not be considered to be limited to the configuration of this illustrated strap receiving mechanism. The exemplary wheel strap receiving mechanism 36 includes a base plate 42 and a roller 44 operable for receiving the engaging end 40 of the wheel strap 34. The wheel strap receiving mechanism 36 also includes a flanged push button attachment 46, a wheel strap engaging button or anchor 48, and a wheel strap actuation handle 50 operable for actuating the wheel strap receiving mechanism 36 to engage and release connection of the wheel strap 34 to the receiving mechanism 36. The components of the wheel strap receiving mechanism 36 can be made of, for example, plastic, metal, and similarly suitable materials of construction. The components of the wheel strap receiving mechanism 36 can be held together utilizing one or more stainless steel and/or aluminum rivets 52 as exemplarily shown. The components of the wheel strap receiving mechanism 36, and specifically the push button attachment assembly 46 in conjunction with the wheel strap button 48, can be biased toward an engaging or latching configuration utilizing a spring 54.

Figure 7:
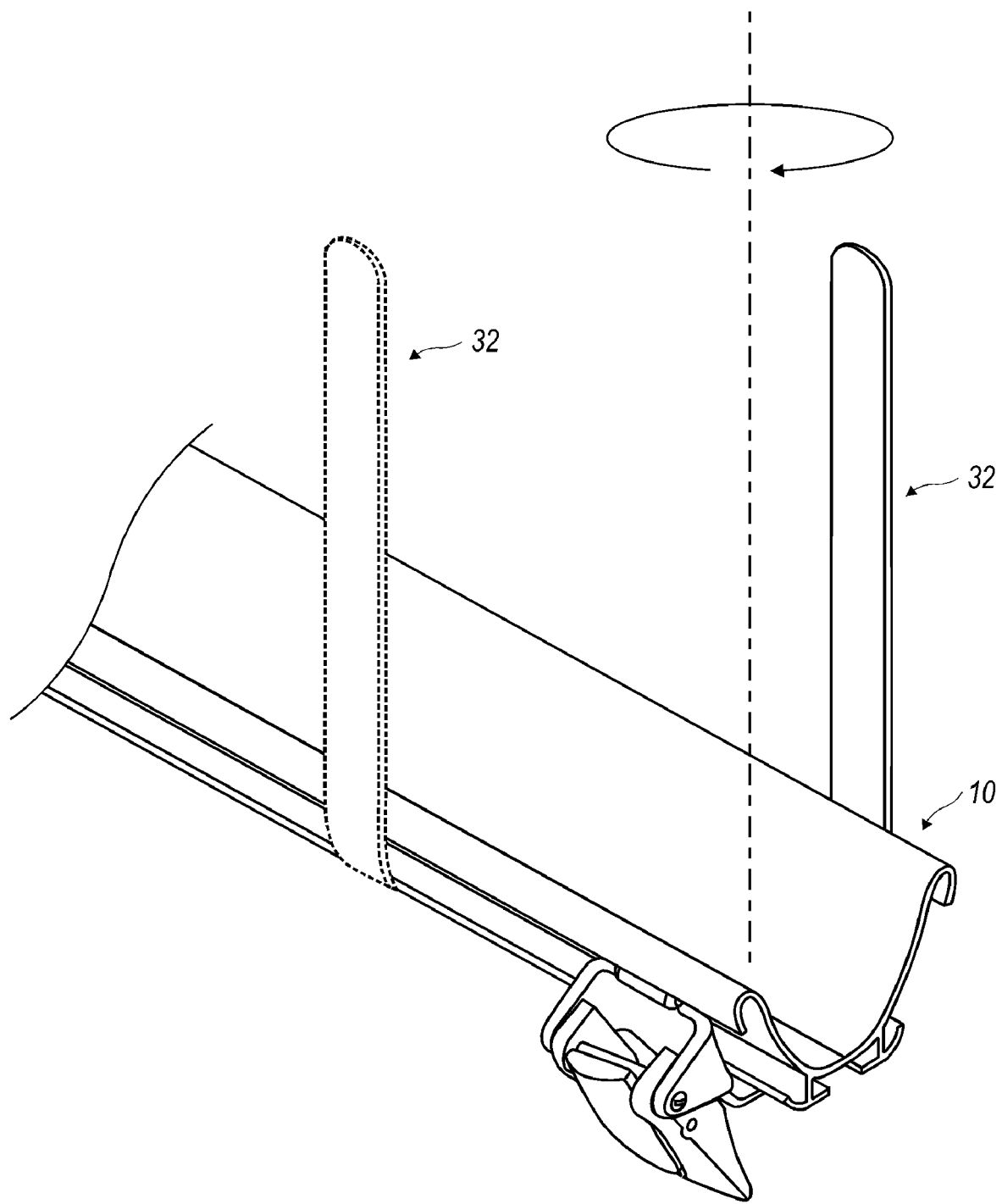
FIG. 7 is a perspective view of the rotatable wheel strap assembly of FIGS. 3 and 4 exemplarily installed upon elongate wheel tray of bicycle carrier system and showing reciprocal configurations about the elongate support member.

The rotation mechanism 38 includes an arrangement or member that permits the wheel strap 34 and wheel strap receiving mechanism 36 to rotate relative to the carrying member (as exemplified in FIG. 7), such as an elongate structural member, or exemplary the illustrated wheel tray. The rotation mechanism 38 can include a round-shaped insert operable for engaging the wheel tray as shown. Alternatively, the insert portion may be square-shaped or otherwise configured for non-rotational engagement in a receiver on the carrier, but which is coupled to a rotation facilitating turn table. The rotation mechanism 38 preferably engages a channel disposed on the underside of the wheel tray. The rotation mechanism 38 can be made of, for example, plastic, metal, and other similarly suitable materials. The rotation mechanism 38 can be a separate component from the wheel strap 34 and the wheel strap receiving mechanism 36, or these components can be integrally formed. As shown in FIG. 7, the rotation mechanism 38 can provide, for example, from about 180 degrees of rotation to complete 360 degrees of rotation.

As described above, the present invention provides a rotatable wheel strap assembly 32 for a bicycle carrier that provides an operator adequate access to the wheel strap assembly 32, and specifically the wheel strap receiving mechanism 36 of the wheel strap assembly 32, whether it is currently positioned on the driver-side of a transporting vehicle or on the passenger-side of a transporting vehicle. The rotatable wheel strap assembly 32 is suitable for use with an elongate wheel tray, such as that used to carry a bicycle, especially an elongate wheel tray that is translatable across the width of the vehicle. The rotatable strap assembly 32, however, should be considered to be installable upon any appropriate receiving structure of a load carrier, and especially those which are of elongate construction.

Figure 5:
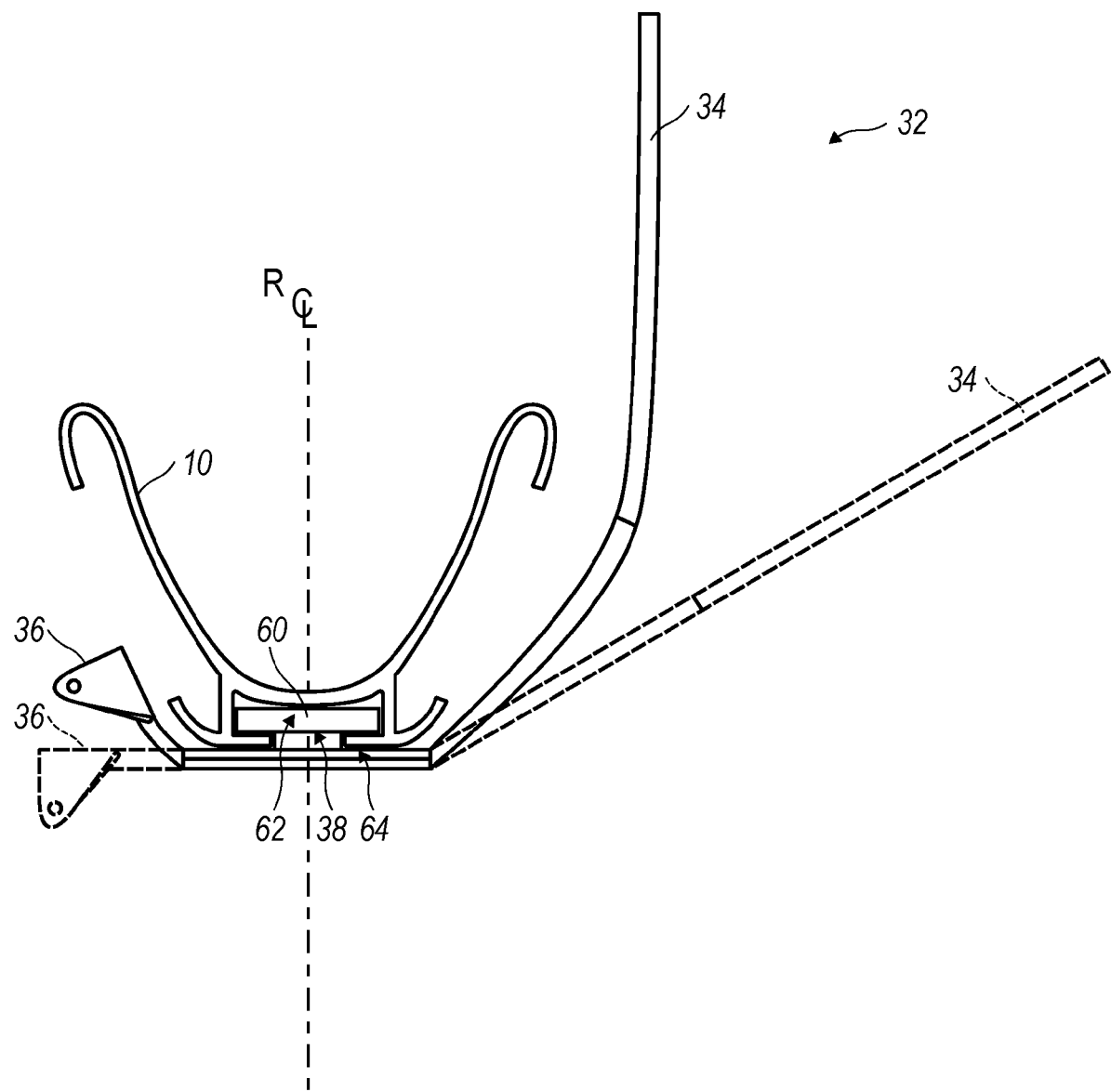
FIG. 5 is an end elevational view of the rotatable wheel strap assembly of FIGS. 3 and 4 exemplarily installed upon and elongate wheel tray of a bicycle carrier system.
Figure 6:
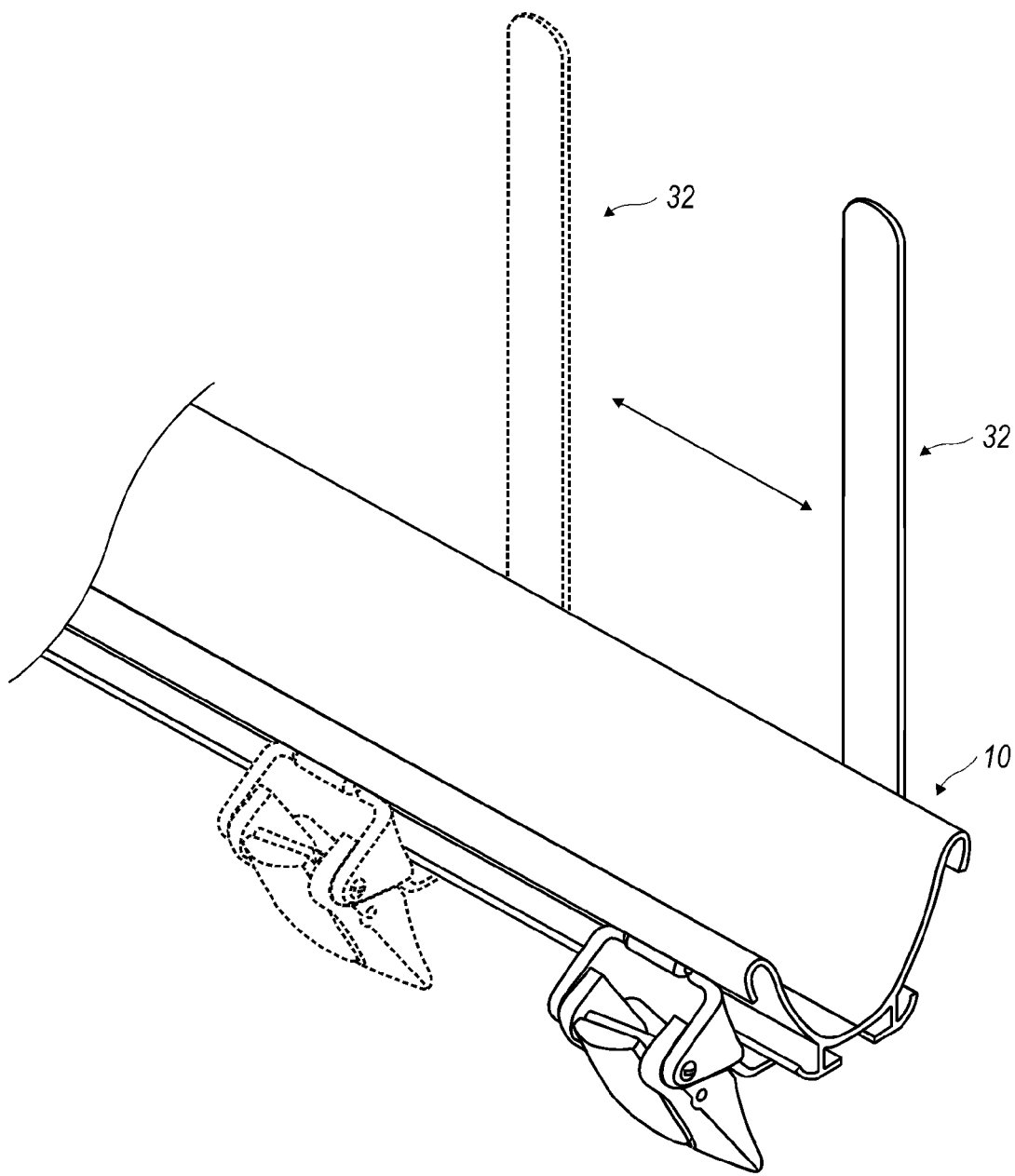
FIG. 6 is a perspective view of the rotatable wheel strap assembly of FIGS. 3 and 4 exemplarily installed upon elongate wheel tray of bicycle carrier system and showing reciprocal movement relative to the elongate support member.

Referring to FIG. 5, the rotation mechanism 38 can include a round or disk-shaped insert 60 operable for engaging the wheel tray 10. Alternatively, and as may be appreciated from the perspective shown in FIG. 5, the insert 60 may be non-round. The shape of the insert 60 could be square, and still be operable for engaging the wheel tray 10 if coupled by a turn table arrangement to the strap and buckle assembly.

The rotation mechanism 38 preferably engages a channel 62 disposed on the underside 64 of the wheel tray 10. An operator is provided adequate access to the wheel strap assembly 32, and specifically the wheel strap receiving mechanism 36 of the wheel strap assembly 32, whether it is currently positioned on the driver-side of a transporting vehicle or on the passenger-side of a transporting vehicle because the wheel strap 34 and the wheel strap receiving mechanism 36 can be moved vertically downward. Once the wheel strap 34' and the wheel strap receiving mechanism 36' are moved or bent vertically downward, the wheel strap assembly 32 can be rotated (as exemplified in FIG. 7), free from interference from the wheel tray 10. Thus, the wheel strap receiving mechanism 36 can be positioned outwardly toward the driver-side of the vehicle for a driver-side mounted wheel tray 10 and outwardly toward the passenger-side of the vehicle for a passenger-side mounted wheel tray 10.

Although the present invention has been described with reference to preferred embodiments and examples thereof, other embodiments and examples can achieve the same results. Variations in and modifications to the present invention will be apparent to those of ordinary skill in the art and the following claims are intended to cover all such equivalent embodiments and examples.

What is claimed is:

1. A load carrier arrangement including a rotatable strap arrangement for securing an article to a load carrier, said arrangement comprising:
    a load carrier having an elongate support member to which an article is releasably secured by a rotatable strap arrangement, said elongate support member having a longitudinal axis about which said rotatable strap arrangement is reciprocal between two working configurations on either of two sides of the elongate support member; said rotatable strap arrangement comprising:
    a rotation mechanism interconnected with said elongate structural member and configured to permit relative rotation therebetween, said rotation mechanism having a rotational centerline about which rotation is affected and said rotational centerline being transversely oriented to said longitudinal axis of said elongate support member;
    a strap coupled to said rotation mechanism, said strap operable for releasably securing the article to said load carrier; and
    a strap receiving mechanism coupled to said rotation mechanism, said strap receiving mechanism operable for securably receiving said strap;
    wherein said elongate structural member is a bicycle wheel tray,
    wherein the rotation mechanism permits about 360 degrees of rotation of said strap and strap receiving mechanism relative to the bicycle wheel tray.

2. The load carrier arrangement as recited in claim 1, wherein said longitudinal axis of said elongate support member is perpendicular to said rotational centerline of said rotation mechanism.

3. The load carrier arrangement as recited in claim 1, wherein the rotation mechanism comprises a round insert operable for engaging the bicycle wheel tray.

4. The load carrier arrangement as recited in claim 1, wherein the rotatable strap arrangement is translatable along an elongate direction of the elongate tray.

5. The load carrier arrangement as recited in claim 1, wherein the strap receiving mechanism comprises a base plate operable for receiving the strap.

6. A rotatable strap arrangement of a load carrier for a transporting vehicle in which the load carrier includes an elongate structural member comprising a bicycle wheel tray, the rotatable strap arrangement comprising: a rotation mechanism couplable to the bicycle wheel tray of a load carrier,
    a strap coupled to the rotation mechanism, the strap operable for securing an object to the bicycle wheel tray;
    a strap receiving mechanism coupled to the rotation mechanism, the strap receiving mechanism operable for securably receiving the strap, wherein the strap receiving mechanism comprises a base plate operable for receiving the strap and wherein the strap receiving mechanism further comprises a roller operable for smoothly receiving the strap;
    said rotation mechanism permitting rotation of said wheel strap and said wheel strap receiving mechanism relative to the elongate wheel tray while coupled thereto.

7. The rotatable strap arrangement of claim 6, wherein the strap receiving mechanism further comprises a push button attachment.

8. The rotatable strap arrangement of claim 7, wherein the strap receiving mechanism further comprises a strap button.

9. The rotatable strap arrangement of claim 8, wherein the strap receiving mechanism further comprises a strap handle operable for actuating the strap receiving mechanism to engage and release the strap.

10. The rotatable strap arrangement of claim 9, wherein the strap receiving mechanism further comprises at least one rivet operable for coupling the base plate to the push button attachment, the strap button, and the strap handle.

11. The rotatable strap arrangement of claim 9, wherein the strap receiving mechanism further comprises a spring operable for biasing the base plate, the push button attachment, the strap button, and the strap handle toward a latching configuration.

12. A load carrier of a transporting vehicle, the load carrier comprising:
    an elongate wheel tray operable for carrying a wheel of a bicycle, the elongate wheel tray having a longitudinal centerline;
    a rotation mechanism coupled to the elongate wheel tray, having a rotational centerline that is perpendicularly oriented to the longitudinal centerline of the elongate wheel tray;
    a wheel strap coupled to the rotation mechanism, the wheel strap operable for securing the wheel of the bicycle to the elongate wheel tray;
    a wheel strap receiving mechanism coupled to the rotation mechanism, the wheel strap receiving mechanism operable for receiving the wheel strap,
    wherein the wheel strap receiving mechanism comprises a base plate operable for receiving the wheel strap and a roller operable for smoothly receiving the wheel strap;
    said rotation mechanism permitting rotation of said wheel strap and said wheel strap receiving mechanism relative to the elongate wheel tray while coupled thereto.

13. The load carrier of claim 12, wherein the rotation mechanism comprises a round insert operable for engaging the elongate wheel tray.

14. The load carrier of claim 12, wherein the wheel strap receiving mechanism further comprises a push button attachment.

15. The load carrier of claim 14, wherein the wheel strap receiving mechanism further comprises a wheel strap button.

16. The load carrier of claim 15, wherein the wheel strap receiving mechanism further comprises a wheel strap handle operable for actuating the wheel strap receiving mechanism to engage and release the wheel strap.

17. The load carrier of claim 16, wherein the wheel strap receiving mechanism further comprises at least one rivet operable for coupling the base plate to the push button attachment, the wheel strap button, and the wheel strap handle.

18. The load carrier of claim 16, wherein the wheel strap receiving mechanism further comprises a spring operable for biasing the base plate, the push button attachment, the wheel strap button, and the wheel strap handle toward a latching configuration.

* * * * *